United States Patent [19]

Berte

[11] Patent Number: 4,719,587

[45] Date of Patent: Jan. 12, 1988

[54] FUTURE BEHAVIOR EQUIPMENT PREDICTIVE SYSTEM

[75] Inventor: Frank J. Berte, West Hartford, Conn.

[73] Assignee: Combustion Engineering, Inc., Windsor, Conn.

[21] Appl. No.: 723,782

[22] Filed: Apr. 16, 1985

[51] Int. Cl.⁴ ........................ G06F 15/20; G06G 7/48

[52] U.S. Cl. .................................... 364/552; 364/550; 364/551

[58] Field of Search ................. 364/424, 507, 550–552

[56] References Cited

U.S. PATENT DOCUMENTS

| | | | |
|---|---|---|---|
| 3,793,512 | 2/1974 | Larenzen | 364/552 |
| 3,882,305 | 5/1975 | Johnstone | 364/551 |
| 4,142,238 | 2/1979 | Brandt et al. | 364/552 |
| 4,296,409 | 10/1981 | Whitaker et al. | 364/551 |
| 4,353,257 | 10/1982 | Vrba et al. | 364/507 |
| 4,401,192 | 8/1983 | Trosky et al. | 364/551 |
| 4,410,950 | 10/1983 | Toyoda et al. | 364/551 |
| 4,589,080 | 3/1986 | Abbott et al. | 364/552 |

*Primary Examiner*—Felix D. Gruber

*Assistant Examiner*—Danielle Laibowitz

*Attorney, Agent, or Firm*—A. E. Fournier, Jr.

[57] ABSTRACT

A system (128) wherein information relating to the performance and availability of equipment is utilized for purposes of appraising the future behavior of the equipment. One purpose, for instance, to which such an appraisal can be put is that of reaching decisions concerning the repair/replacement/refurbishment of the equipment. The subject system (128) includes performance means (130), availability means (132), degradation means (134) and updating means (136), all suitably connected in operative relation one with another. The preformance means (130) is operative as a source of data pertaining to the performance of the equipment. The availability means (132), on the other hand, is operative as a source of data pertaining to the availability of the equipment. Continuing, the degradation means (134) is cross-linked to both the performance means (130) and the availability means (132), and is operative as a source of data pertaining to the degradation of the equipment. Lastly, the updating means (136) is operative as a source of data relating to the latest reported status of the equipment.

12 Claims, 5 Drawing Figures

FUTURE BEHAVIOR EQUIPMENT PREDICTIVE SYSTEM

BACKGROUND OF THE INVENTION

This invention relates to systems operative for purposes of providing information concerning the nature of the condition of equipment, and, more specifically, to a system which can be updated and wherein data pertaining to the projected performance and availability of equipment is crosslinked with data pertaining to the degradation of the equipment for purposes of providing a basis from which to appraise the future behavior of the equipment.

Whenever the acquisition of any equipment is being contemplated, be the equipment large or small in nature, there are a number of matters to which consideration must be given, if one is to ensure that the equipment which ultimately is acquired is the right equipment for the task sought to be accomplished thereby. To this end, there clearly exists a requirement to properly identify the particular needs for which the equipment is being sought. Likewise, there exists a requirement to properly identify the type of equipment which is best capable of satisfying the needs for which the equipment is being sought. This matching of equipment capability to the requirements of the task sought to be accomplished through the utilization of the equipment that is to be acquired obviously is of paramount importance.

Normally, however, one finds sufficient attention being given to this matter of matching equipment capability to the needs of the task that is to be accomplished through the use thereof, before the process of actually selecting the equipment to be acquired is completed. If anything, the party who is seeking to acquire the equipment will most often not only be in a position to identify the type of equipment that is being sought, but also will be able to identify the various companies that manufacture such equipment, before the actual selection is made of the equipment to be acquired. Rather, the party seeking to acquire the equipment is in a position of having to change the focus of his attention from that of a consideration of what he wants, i.e., which type of equipment, to that of a consideration of from whom, i.e., which company, should he acquire the equipment. In attempting, moreover, to reach a decision in this regard the party seeking to acquire the equipment will undoubtedly consider a number of things.

For example, the price quoted for the equipment by each of the various manufacturers thereof certainly would be an important consideration insofar as concerns selecting from whom to acquire the equipment. But price alone, particularly in the case of equipment that is relatively large in nature is not always the determining factor. Commonly, one finds that the larger the equipment, and in most cases concomitantly the more expensive the equipment the more important factors such as the projected performance and availability of the equipment become.

In most, if not all, instances, some measure of performance is established by equipment manufacturers for the equipment they supply. Moreover, depending on the specific nature of the equipment, the measure of performance to be expected from the equipment may be defined in any of a different number of ways. For instance, the measure of performance of the equipment may be defined in terms of the efficiency of the equipment, or in terms of the horsepower thereof, or in terms of the temperature and/or pressure at which the equipment can be operated, or in terms of the fuel consumption of the equipment, etc. Whatever measure of performance which the equipment manufacturer projects for the equipment though, one can be sure that the equipment as designed is capable of better performance than that being quoted by the equipment manufacturer for the equipment. As everyone knows the reason for this is that the equipment manufacturer simply understates the measure of performance of which the equipment is capable in order to avoid making claims for the equipment that might expose the equipment manufacturer to liability in the event that the equipment is incapable of providing the performance being claimed therefor by the equipment manufacturer.

With regard to equipment which is intended to be operated essentially continuously, the amount of time that this equipment will actually be available for use is often an important consideration. That is, at least insofar as some types of equipment are concerned, an important consideration which bears upon the question of from whom to acquire the equipment is that of the availability of the equipment as projected by the manufacturer thereof. For purposes of this discussion, availability is defined as being the ratio expressed in a percentage of the amount of time that it is projected that the equipment will be operational as compared to the total amount of time that it is desired to have the equipment be operational. Any number of things may give rise to the shutting down of the equipment such as the need to accomplish ordinary maintenance of the equipment, or because the equipment is in need of repair, etc. Whatever the reason for the shutdown of the equipment might be, however, equipment which is reputed to have a history of frequent shutdowns will normally be perceived as being at a disadvantage when compared to equipment which enjoys a reputation of being less prone to shutdowns, at least insofar as concerns the selection of which equipment to acquire other things being equal.

For purposes of establishing for a particular type of equipment the nature of the performance which one might expect to receive therefrom, equipment manufacturers will normally look at a number of things, which, at least, in their estimation are believed to bear on such a determination. By way of exemplification and not limitation, one base of reference, for instance, which equipment manufacturers will look at ordinarily in this context is that of the design data which may be applicable to this particular type of equipment. Another base of reference that the equipment manufacturers will commonly make use of, assuming that the particular type of equipment in question has been used previously for a statistically significant period of time so that such information is available, is that of how closely this particular type of equipment has in actuality lived up to the level of performance which had been projected therefor by the manufacturers thereof. With further regard to the matter of operational experience, the results thereof may, where applicable, be additionally broken down by the equipment manufacturers into categories according to the various kinds of applications in which the equipment has been utilized, and/or according to the major users thereof, etc. However, notwithstanding what base or bases of reference which an equipment manufacturer may make use of for purposes of establishing a projected performance for the equipment he manufactures, there is no way that the equipment manufacturer can establish with absolute certainty exactly what the future performance of his equipment will in actuality turn out to be.

What has been set forth above with regard to the establishment of performance levels for equipment essentially is equally applicable to the establishment of availability levels for equipment. That is, as in the case of the establishment of performance levels, equipment manufacturers when establishing availability levels for their equipment will ordinarily refer to the design data that is applicable to the particular type of equipment for which the availability levels are sought to be established. Likewise, the equipment manufacturers will in this regard commonly make use of any information relating to actual operating experience with the particular type of equipment, if meaningful information of this nature is available. Further, where applicable the information relating to the operational experience with the equipment often will be categorized according to the different kinds of applications in which this particular type of equipment has been utilized, and/or according to the experiences which each of the major users of the equipment have had when the equipment has been employed thereby. Here also, however, the equipment manufacturers are unable to state with absolute certainty what the availability level for this equipment will in actual reality ultimately prove to be when the equipment is placed in operation.

With every passing day, one finds more and more attention being focused by users as well as manufacturers of equipment, and in particular users and manufacturers of larger equipment, on ways in which the useful life of equipment can be extended. More specifically, the focus of this attention is directed towards the optimization of equipment performance and availability up to and beyond the design life of the equipment. Moreover, making the best decisions to attain the goal of achieving life extension of equipment consistent with the needs of the user of the equipment and the financial constraints under which such users of equipment of necessity must operate is acknowledged to be a difficult process. On the other hand, it is also acknowledged that the benefits to the users of the equipment which would flow thereto from the successful attainment thereby of this goal of life extension of equipment would be well worth the efforts that might be required to be expended in the course of pursuing such a goal.

By way of exemplification and not limitation, the successful attainment of such a goal of life extension of equipment will result in making available information relating to such equipment that can be put to a variety of different uses. For instance, as regards particularly equipment that has been operational for some time, information will be available relating to the so-called "aging" of the equipment and/or the various components which are to be found embodied in the equipment. Such information relating to the aging of the components of which the equipment is composed is critical to a life extension determination of the current remaining life status of not only the individual component itself but also of the equipment of which the individual component forms a part. As such, information of this nature relating to the aging of the equipment and/or the individual components thereof can be utilized for purposes of preparing prioritized inspection and test plans for those components of the equipment which are inspectable, as well as for purposes of assessing the remaining life status of those components which for whatever reason may not be capable of being inspected.

Secondly, information that is derived from the successful accomplishment of the goal of life extension of equipment can be utilized for purposes of comparing predicted equipment performance and availability with actual performance and availability characteristics for the equipment. As used herein, the term performance characteristics is intended to encompass such things as thermo-hydraulic parameters, etc. The term availability characteristics is intended to encompass such things as availability, capacity factors, repair man-hours, etc.

Thirdly, based on the successful realization of the goal of life extension of equipment, information will exist relating to the degradation that has been experienced by the equipment and/or the individual components of which the equipment is composed. Moreover, information of this nature can be utilized for purposes of planning future operations and repair/replace/refurbish strategies insofar as the equipment is concerned. In turn, there then exists the capability of assessing the impact which the strategies will have on the performance and availability of the equipment as well as on the cost associated with the operation thereof.

Fourthly, with the information in hand that is available as a consequence of having successfully attained the aforereferenced goal of life extension of equipment, there will exist a capability of assessing future requirements for equipment outage activities occasioned by the implementation of a program of life extension of equipment. In addition, an assessment can then also be made therefrom as to major spare part inventory needs, and the number of repair man-hours that may be required consistent with the implementation of planned future operating strategies. Finally, such information will also be useful in evaluating financial allocation needs for purposes of distributing the cost arising from the implementation of the life extension program over the period of time for which the life of the equipment will be extended.

Fifthly, the information derived from the successful realization of the goal of life extension of equipment will also be found to have use in effecting an evaluation of the problems and/or solutions to those problems which have extended effects and/or which may span the interface that exists between the equipment in question and other equipment.

A need has thus been evidenced in the prior art for a new and improved system suitable for use for purposes of effectuating an appraisal of the future behavior of equipment. More specifically, a need has thus been evidenced for such a system which could be employed for purposes of evaluating future extended life equipment behavior as a function of hypothetically postulated repair/replace/refurbish options, and wherein the basis of the evaluation can be either cost/benefit or risk of unavailability, or both. In addition, such a system desirably should be capable of being interfaced with other systems that are being utilized to effect an assessment of the future extension life behavior of other equipment. Moreover, such a system desirably should be further characterized by the fact that the equipment is subject to consideration both from a generic and a specific standpoint, and wherein the foundation from which this consideration is made is capable of being updated so as to reflect additional operating experience with the equipment.

It is, therefore, an object of the present invention to provide a new and improved system suitable for use for purposes of effectuating an appraisal of the future behavior of equipment.

It is another object of the present invention to provide such a future behavior equipment predictive system which is characterized in that in the case of equipment that has been operational for some time a determination can be had therewith of the current remaining life status of the equipment.

It is still another object of the present invention to provide such a future behavior equipment predictive system which is characterized in that a comparison can be had therewith between the predictive performance and availability characteristics of the equipment and the actual performance and availability characteristics of the equipment.

A further object of the present invention is to provide such a future behavior equipment predictive system which is characterized in that projections can be had therewith as to the degradation of the equipment for purposes of planning future operating and/or repair/replace/refurbish strategies.

A still further object of the present invention is to provide such a future behavior equipment predictive system which is characterized in that consistent with plans for the future operation of the equipment predictions can be had therewith as to what should be required in terms of time, effort and resources to support such plans for the future operation of the equipment.

Yet another object of the present invention is to provide such a future behavior equipment predictive system which is characterized in that usage can be made thereof in the evaluation of problems or solutions which have extended effects and span the interfaces between the equipment in question and other equipment.

Yet still another object of the present invention is to provide such a future behavior equipment predictive system which is characterized in that the system can either be employed with new equipment or be retrofitted to equipment that has already been placed in operation.

SUMMARY OF THE INVENTION

In accordance with the present invention there is provided a new and improved system suitable for use for purposes of effectuating an appraisal of the future behavior of equipment. The subject future behavior equipment predictive comprises suitably connected in operative relation one to another performance means, availability means, degradation means and updating means. The performance means is provided in the form of inputs thereto with data pertaining to the performance characteristics of the equipment, which is obtained from a variety of sources. By way of exemplification and not limitation, this variety of sources of data pertaining to the performance characteristics of the equipment encompasses depending upon the nature of the equipment most, if not all, of the following: performance characteristics for such equipment available from the manufacturer thereof, performance characteristics for such equipment available from industry sources/trade or research organizations, performance characteristics for such equipment available from past and/or present users thereof, performance characteristics for the specific equipment in question provided by the present operator thereof, performance characteristics for the specific equipment in question derived from inspections thereof conducted for purposes of providing an input to the performance means, and performance characteristics for the specific equipment in question derived from tests run thereon for purposes of providing an input to the performance means. The availability means is provided in the form of inputs with data pertaining to the availability characteristics of the equipment, which is obtained from a variety of sources. The variety of sources from which data pertaining to the availability characteristics of the equipment is provided to the availability means is of the same nature as that enumerated above in connection with the discussion of the performance means. The degradation means is provided in the form of inputs with data that is obtained from various sources pertaining to the state of degradation of the equipment as defined by the extent to which the equipment has been subjected, by way of exemplification and not limitation, to corrosion, erosion, fatigue and leakage. The degradation means is cross-linked to both the performance means and the availability means such that the output from the performance means and the output from the availability means are each made to reflect the effect of degradation on the equipment as a consequence of the performance means and the availability means each being fed an output from the degradation means. The updating means is provided in the form of inputs with data obtained from monitoring the operation of the equipment. The output of the updating means is fed in the form of an input to both the performance means and the availability means for purposes of updating the data thereof.

DESCRIPTION OF A PREFERRED EMBODIMENT

Figure 2:
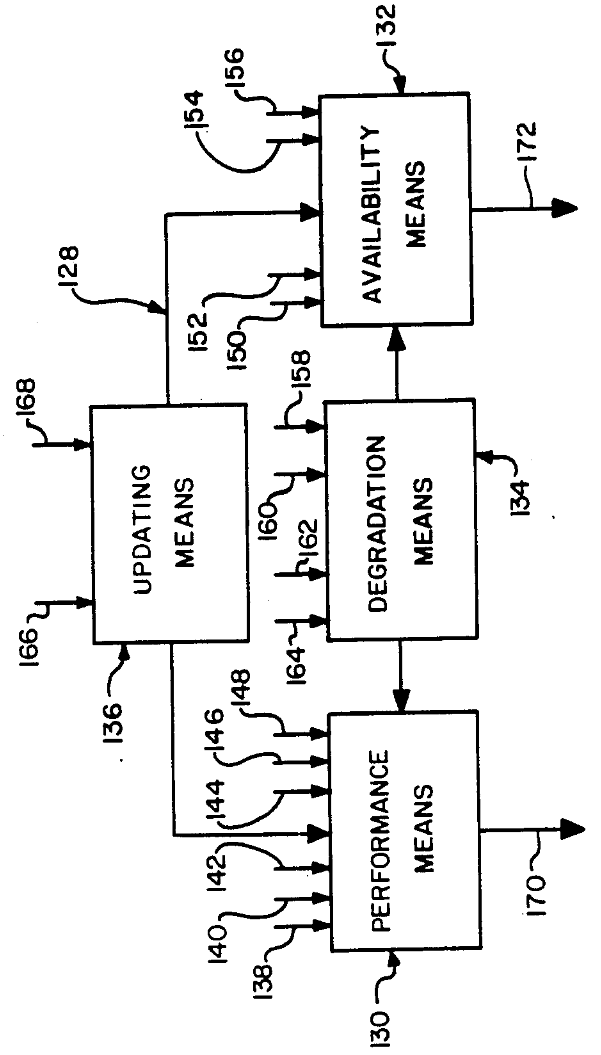
FIG. 2 is a block diagram of a future behavior equipment predictive system constructed in accordance with the present invention.

Referring now to the drawing, and more particularly to FIG. 2 thereof, there is depicted therein in block diagram form a future behavior equipment predictive system, generally designated by the reference numeral 128, constructed in accordance with the present invention. The future behavior equipment predictive system 128 is operative for purposes of effectuating an appraisal of the future behavior of equipment. As best understood with reference to FIG. 2, the future behavior equipment predictive system 128 comprises suitably connected in operative relation one to another as will be more fully described hereinafter performance means, generally designated in FIG. 2 by the reference numeral 130;

availability means, generally designated in FIG. 2 by the reference numeral 132; degradation means, generally designated in FIG. 2 by the reference numeral 134; and updating means, generally designated in FIG. 2 by the reference numeral 136.

For purposes of setting forth a description of the nature of the construction and the mode of operation of the future behavior equipment predictive system 128 to which the present invention is directed, the future behavior equipment predictive system 128 will be described in the context of its utilization for purposes of appraising the future behavior of the boiler and/or the individual components thereof which can be found depicted in FIG. 1, and wherein the boiler per se has been designated generally by the reference numeral 10. Insofar as the description that follows of the future behavior equipment predictive system 128 is concerned, the boiler 10 is intended to represent the boiler island portion of a fossil fuel fired power plant. It is to be clearly understood, however, that the future behavior equipment predictive system 128 is not limited solely to being utilized for purposes of effectuating an appraisal of the future behavior of the boiler 10, but is equally applicable to being utilized for purposes of effectuating the future behavior of other forms of equipment such as the turbine/generator portion of a fossil fuel fired power plant, the balance of plant equipment for a fossil fuel fired power plant installation, the equipment utilized in a chemical processing plant installation, the equipment utilized in oil and/or gas installations, etc. In summary, it is to be understood that the word "equipment" as utilized in the phrase "future behavior equipment predictive system" can be employed in a generic sense to refer to equipment other than the boiler 10 and the various individual components of the boiler 10 that are depicted in FIG. 1 and are yet to be described as well as in a specific sense to refer to the boiler 10 per se and the other components thereof which when taken collectively comprise the boiler 10 as shown in FIG. 1 of the drawing.

Figure 1:
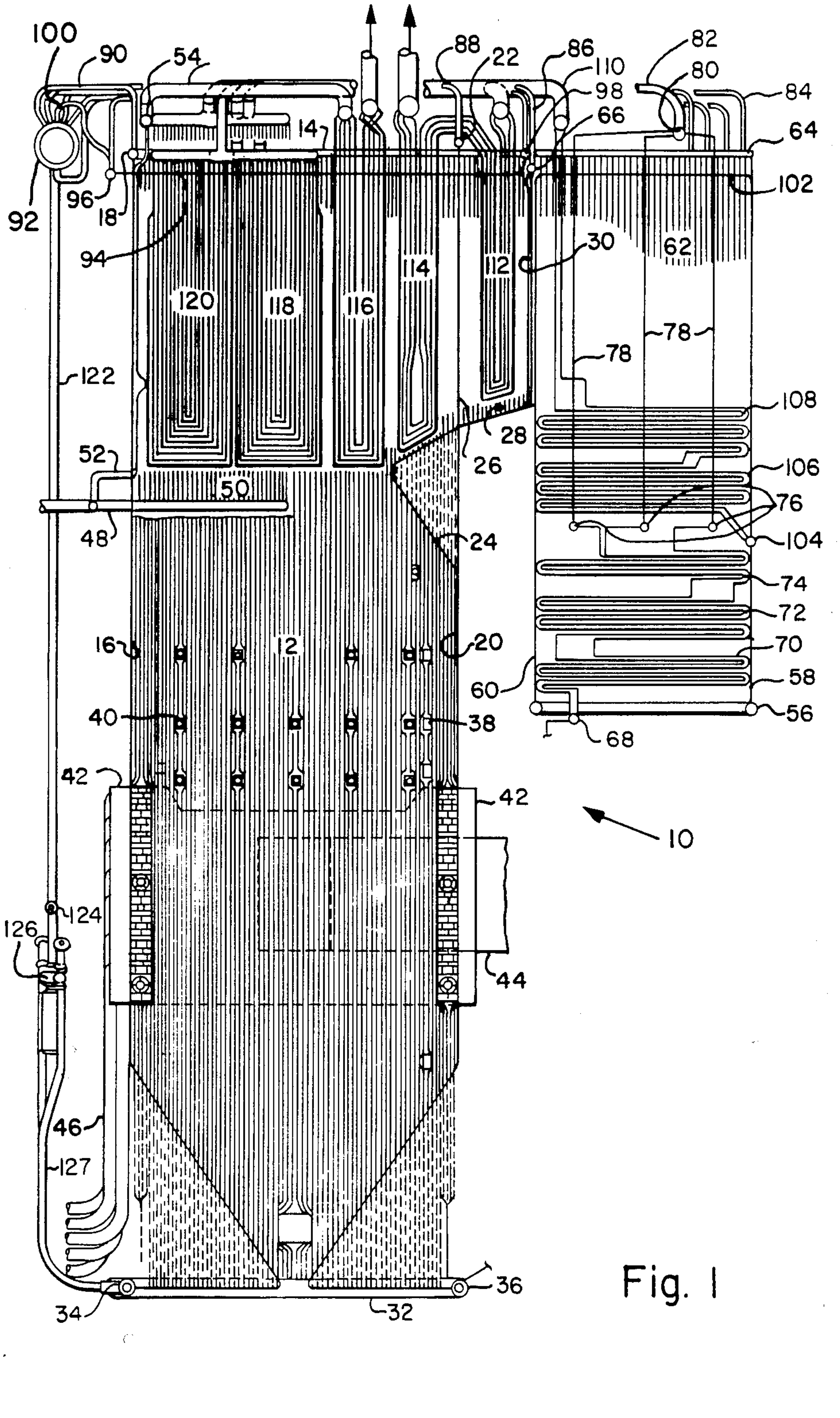
FIG. 1 is a side elevational view of a boiler with which a future behavior equipment predictive system constructed in accordance with the present invention is capable of being employed.

Proceeding now with a description of the boiler 10 and the various components thereof, reference will be had for this purpose in particular to FIG. 1 of the drawing. The boiler 10 as shown in FIG. 1 embodies a furnace portion. The latter furnace portion includes a plurality of side wall tubes, the latter being generally designated by the reference numeral 12 in FIG. 1, a plurality of front wall tubes, the latter being generally designated by the reference numeral 16 in FIG. 1, and a plurality of rear wall tubes, the latter being generally designated by the reference numeral 20 in FIG. 1. At the upper end thereof as viewed with reference to FIG. 1, the plurality of side wall tubes 12 and the plurality of front wall tubes 16 are in known fashion suitably connected to the outlet headers 14 and 18, respectively. Encompassed within the upper section of the furnace portion of the boiler 10 as seen with reference to FIG. 1 are the plurality of rear arch tubes 24, the plurality of rear hanger tubes 26, the plurality of furnace and backpass extended side wall tubes 28, and the plurality of rear screen tubes 30. There is suitably connected in known fashion to the plurality of rear hanger tubes 26 the outlet header 22. At the lower end thereof as viewed with reference to FIG. 1, the furnace portion of the boiler 10 is provided with a lower left drum, a lower front drum and a lower rear drum denoted by the reference numerals 32, 34 and 36, respectively.

Looking next at the central section of the furnace portion of the boiler 10, there is provided therewithin a plurality of observation doors denoted in FIG. 1 by the reference numeral 38, suitably placed so as to enable observation to be had therethrough of the interior of the furnace portion of the boiler 10. Also, positioned within the central section of the furnace portion of the boiler 10, as viewed with reference to FIG. 1, are a plurality of sootblowers, identified in FIG. 1 by the reference numeral 40, which in known fashion are designed to be operative to effectuate a cleaning of the tubes that are located in proximity thereto.

In order for combustion to take place within the interior of the furnace portion of the boiler 10 there is required to be introduced therewithin air and fossil fuel. To this end, the furnace portion of the boiler 10 is provided with a plurality of windboxes, seen at 42 in FIG. 1. Further, the furnace portion of the boiler 10 is provided with air duct means, denoted by the reference numeral 44 in FIG. 1, and through which as the name thereof implies air is made to enter the furnace portion of the boiler 10. Moreover, a plurality of fuel pipes, which have been identified in FIG. 1 by the reference numeral 46, function to interconnect the interior of the furnace portion of the boiler 10 with a suitable source of pulverized fossil fuel whereby fossil fuel in suitable form for burning is caused to be transmitted therethrough from the source of burnable fossil fuel to the furnace portion of the boiler 10 whereupon in known fashion the fossil fuel is introduced thereinto.

Referring again to FIG. 1 of the drawing, the boiler 10 embodies a plurality of side radian wall tubes, the latter being identified therein by the reference numeral 50. Cooperatively associated with the plurality of side radian wall tubes 50 is a plurality of front radian wall tubes, the latter being identified in FIG. 1 by the reference numeral 52. In turn, the side radian wall tubes 50 and the front radian wall tubes 52 are suitably connected in known fashion to the radian wall headers, which by means of the reference numeral 48 are identified in FIG. 1. Note is also taken here of the radian upper wall outlet headers, which can be found depicted at the upper end of the boiler 10 as viewed with reference to FIG. 1 and wherein the radian upper wall outlet headers have been identified by the reference numeral 54.

As shown in FIG. 1, the boiler 10 is provided with a backpass section, the latter including the plurality of backpass rear wall tubes seen at 58, the plurality of backpass front wall tubes seen at 60 and the plurality of backpass side wall tubes seen at 62. In known fashion, the plurality of backpass rear wall tubes 58, the plurality of backpass front wall tubes 60 and the plurality of backpass side wall tubes 62 are suitably connected in operative relation to the backpass lower header means and the backpass upper side wall header means, which have been denoted in FIG. 1 by the reference numerals 56 and 64, respectively. Reference is also made here to the upper rear outlet header means, which has been identified in FIG. 1 by the reference numeral 66.

The next section of the boiler 10 that is to be described herein is that of the economizer. Embraced therewithin, as best understood with reference to FIG. 1 of the drawing, is a plurality of lower tube assemblies identified therein by the reference numeral 70, a plurality of intermediate tube assemblies identified therein by the reference numeral 72 and a plurality of upper tube assemblies identified therein by the reference numeral 74. With further reference to FIG. 1, operatively connected in known fashion to the economizer lower tube assemblies 70 is the economizer inlet header denoted therein by the reference numeral 68. As illustrated in FIG. 1, the economizer of the boiler 10 includes a plurality of support terminal tubes 78 to which intermediate headers designated in FIG. 1 by the reference numeral 76 are operatively connected.

Continuing with the description of the boiler 10 constructed as depicted in FIG. 1 of the drawing, adjacent the top of the boiler 10 as viewed with reference to FIG. 1 there is to be found illustrated thereat the economizer outlet header, denominated by the reference numeral 80, and to which the outlet means, seen at 82 in FIG. 1, is suitably connected in known fashion. While still giving consideration to the top of the boiler 10 as viewed with reference to FIG. 1, mention is made here of the fact that there is to be found located thereat the upper side outlet header riser tubes identified therein by the reference numeral 84, the upper rear outlet header riser tubes identified therein by the reference numeral 86, the upper rear hanger outlet header riser tubes identified therein by the reference numeral 88 and the upper front outlet header riser tubes identified therein by the reference numeral 90.

Also to be found located at the top as viewed with reference to FIG. 1 of the boiler 10 is a steam drum, the latter being denoted therein by the reference numeral 92. Cooperatively associated in known fashion with the steam drum 92 are the front header riser tubes identified in FIG. 1 by the reference numeral 100. Moreover, thereat in addition there is to be found the roof tubes which in FIG. 1 are designated by the reference numeral 94, and the front header designated therein by the reference numeral 96 and the rear header denoted in FIG. 1 by the reference numeral 98 to which the roof tubes 94 in known fashion are suitably connected. Before leaving a consideration of the upper portion of the boiler 10 as viewed with reference to FIG. 1, mention is made here of the presence of the backpass roof tubes which can be found depicted in the upper right hand portion of the boiler 10 whereat they are identified by means of the reference numeral 102.

Further with respect to the description of the boiler 10 constructed as illustrated in FIG. 1 of the drawing, the boiler 10 as shown therein embodies in accordance with conventional practice a reheater and a superheater. To this end, the reheater of the boiler 10 as will be best understood with reference to FIG. 1 includes the lower tube assembly which is identified in the latter FIG. by the reference numeral 106 and to which the inlet header denoted in FIG. 1 by the reference numeral 104 is depicted in known fashion as being operatively connected therewith. As shown in FIG. 1, the reheater of the boiler 10 further includes an upper tube assembly seen therein at 108 and which in known fashion is operatively connected with the outlet header, the latter being designated in FIG. 1 by the reference numeral 110. Insofar as the superheater of the boiler 10 is concerned, as will be understood with reference to FIG. 1 of the drawing, the superheater of the boiler 10 encompasses the vertical rear tube assemblies denoted therein by the reference numeral 112, the vertical front tube assemblies denoted therein by the reference numeral 114, the vertical platen assemblies denoted therein by the reference numeral 116, the vertical rear division panel assemblies denoted therein by the reference numeral 118 and the vertical front division panel assemblies denoted therein by the reference numeral 120, with the aforedescribed assemblies 112, 114, 116, 118 and 120 being operatively connected to one another in known fashion.

To complete the description of the nature of the construction of the boiler 10 constructed as shown in FIG. 1 of the drawing, reference is had to the downcomer means seen therein at 122, the downcomer pump suction manifold seen therein at 124, the circulation pumps seen therein at 126, and the downcomer pump discharge lines which are denoted in FIG. 1 by the reference numeral 127.

Inasmuch as the mode of operation of the boiler 10 is well-known to those skilled in the prior art, it is deemed sufficient for purposes of acquiring an understanding of the subject matter of the present invention that only a brief summary be set forth herein of the mode of operation of the boiler 10. Should a more complete description of the mode of operation of the boiler 10 be desired, reference may be had for this purpose to the prior art. Thus, by way of a summary, as previously described herein the boiler 10 includes a furnace portion. Fossil fuel and air are introduced by means of the fuel pipes 46 and the air duct means 44 into the furnace portion of the boiler 10 whereat the fossil fuel is burned as a consequence of the action of burners (not shown) that are suitably incorporated into the windboxes 42. The hot gases produced from the combustion of the fossil fuel and the air within the furnace portion of the boiler 10 rise and exit therefrom through the horizontal gas pass and the rear pass of the boiler 10, both of which in terms of the nature of the construction thereof have been previously described herein, before being exhausted in conventional fashion from the boiler 10 to the atmosphere. In accordance with conventional practice water is heated in the various tube assemblies 70, 72 and 74 of the economizer of the boiler 10 and then flows through the plurality of tubes that serve to define, as described in detail hereinbefore, the furnace portion of the boiler 10. During the course of the passage thereof therethrough steam is generated. The steam is then made to flow through the various heat exchangers with which in known fashion the boiler 10 is provided. Thereafter, the steam commonly is made to flow to a turbine (not shown), which forms one component of a turbine/generator set (not shown), such that the steam provides the motive power to drive the turbine (not shown) and thereby also the generator (not shown), which in known fashion is cooperatively associated with the turbine, such that electricity is thus produced from the generator (not shown).

With the preceding by way of background, a description will now be had with particular reference being given to FIG. 2 of the drawing to the future behavior equipment predictive system 128 which forms the subject matter of the present invention. For this purpose, a description of the nature of the construction and the mode of operation of the future behavior equipment predictive system 128 will be had in the context of the manner in which the future behavior equipment predictive system 128 can be utilized in order to effectuate an appraisal of the future behavior of the boiler 10 per se and/or of the individual components thereof such as the economizer, the reheater, the superheater, etc., and/or of the turbine/generator set (not shown) and/or the individual components thereof such as the turbine (not shown), the generator (not shown), etc. By way of reiteration and with reference to FIG. 2 of the drawing, the future behavior equipment predictive system 128 comprises suitably connected in operative relation one to another performance means 130, availability means 132, degradation means 134 and updating means 136.

Attention will be focused first on the performance means 130. The performance means 130 is designed to be operative to function as a receiver and a reservoir of data pertaining to the performance characteristics of the equipment which in this case, by way of exemplification and not limitation, will be taken to be the boiler 10 that has been depicted in FIG. 1 of the drawing, and for which a description of the nature of the construction and the mode of operation thereof has been set forth hereinbefore. To this end, the performance means 130 receives a plurality of inputs from a variety of sources relating to the performance characteristics of the boiler 10 of FIG. 1. By way of illustration and not limitation, the performance means 130, as will be best understood with a reference to FIG. 2 of the drawing, may be made to receive: a first input, the latter being denoted in FIG. 2 by the reference numeral 138, in the form of data relating to the performance characteristics of the boiler 10 which has been made available for the boiler 10 by the manufacturer of the latter; a second input, the latter being denoted in FIG. 2 by the reference numeral 140, in the form of data relating to the performance characteristics of the boiler 10 which has been made available for the boiler 10 by industry sources/trade or research organizations; a third input, the latter being denoted in FIG. 2 by the reference numeral 142, in the form of data relating to the performance characteristics of the boiler 10 which has been made available for the boiler 10 by past and/or present users of the latter; a fourth input, the latter being denoted in FIG. 2 by the reference numeral 144, in the form of data relating to the performance characteristics of the boiler 10 itself which has been made available for the boiler 10 by the present operator of the boiler 10; a fifth input, the latter being denoted in FIG. 2 by the reference numeral 146, in the form of data derived from inspections of the boiler 10 conducted for purposes of generating an input to be provided to the performance means 130; and a sixth input, the latter being denoted in FIG. 2 by the reference numeral 148, in the form of data derived from tests run on the boiler 10 for purposes of generating an input to be provided to the performance means 130. Although the performance means 130 has been depicted in FIG. 2 and has been described hereinbefore as being provided with a plurality of inputs, i.e., the inputs 138, 140, 142, 144, 146 and 148, it is to be understood that the performance means 130 may, without departing from the essence of the present invention, be provided with a greater or a lesser number of inputs, as established in particular by a consideration of the nature of the specific type of equipment in connection with which it is desired to utilize the future behavior equipment predictive system 128 of the present invention for purposes of effectuating an appraisal of the future behavior of the equipment in question. The key determinants, insofar as the number of inputs that are provided to the performance means 130 is concerned, are the nature of the equipment whose future behavior is sought to be appraised, and the performance data which is available for such equipment or which can be obtained from inspections conducted on and test run on the equipment in question.

Consideration will next be given to the availability means 132. The availability means 132 is designed to be operative to function as a receiver and a reservoir of data pertaining to the availability characteristics of equipment which in this case has been deemed to be the boiler 10 that is depicted in FIG. 1 of the drawing and a description of which has previously been set forth herein. As such, the availability means 132 receives from a variety of sources a plurality of inputs relating to the availability characteristics of the boiler 10 illustrated in FIG. 1. By way of exemplification and not limitation, the availability means 132 may, with reference to FIG. 2 of the drawing, be made to receive: a first input, the latter being denoted in FIG. 2 by the reference numeral 150, in the form of data relating to the availability characteristics of the boiler 10 which has been made available for the boiler 10 by the manufacturer of the latter; a second input, the latter being denoted in FIG. 2 by the reference numeral 152, in the form of data relating to the availability characteristics of the boiler 10 which has been made available for the boiler 10 by industry sources/trade or research organizations; a third input, the latter being denoted in FIG. 2 by the reference numeral 154, in the form of data relating to the availability characteristics of the boiler 10 which has been made available for the boiler 10 by past and/or present users of the latter; and a fourth input, the latter being denoted in FIG. 2 by the reference numeral 156, in the form of data relating to the availability characteristics of the boiler 10 itself which has been made available for the boiler 10 by the present operator of the boiler 10. Although the availability means 132 has been depicted in FIG. 2 and has been described hereinbefore as being provided with a plurality of inputs, i.e., the inputs 150, 152, 154 and 156, it is to be understood that the availability means 132 may, without departing from the essence of the present invention, be provided with a greater or a lesser number of inputs, as established in particular by a consideration of the nature of the specific type of equipment in connection with which it is desired to utilize the future behavior equipment predictive system 128 of the present invention for purposes of effectuating an appraisal of the future behavior of the equipment in question. The key determinants, insofar as the number of inputs that are provided to the availability means 132 is concerned, are the nature of the equipment whose future behavior is sought to be appraised, and the availability data which is available for such equipment.

Thirdly, with respect to the degradation means 134, the latter is designed to be operative to function as a receiver and a reservoir of data pertaining to the degradation of the equipment which in this case has been deemed to be the boiler 10 that can be found depicted in FIG. 1 of the drawing and which has been described hereinbefore. For this purpose, the degradation means 134 receives a plurality of inputs from various sources relating to the degradation of the boiler 10 depicted in FIG. 1. By way of exemplification and not limitation, the degradation means 134 may, with reference to FIG. 2 of the drawing, be made to receive: a first input, the latter being denoted in FIG. 2 by the reference numeral 158, in the form of data relating to the extent to which the boiler 10 has suffered from erosion; a second input, the latter being denoted in FIG. 2 by the reference numeral 160, in the form of data relating to the extent to which the boiler 10 has suffered from corrosion; a third input, the latter being denoted in FIG. 2 by the reference numeral 162, in the form of data relating to the extent to which the boiler 10 has suffered from fatigue; and a fourth input, the latter being denoted in FIG. 2 by the reference numeral 164, in the form of data relating to the extent to which the boiler 10 has suffered from leakage. Although the degradation means 134 has been depicted in FIG. 2 and has been described hereinbefore as being provided with a plurality of inputs, i.e., the inputs 158, 160, 162 and 164, it is to be understood that the degradation means 134 may, without departing from the essence of the present invention, be provided with a greater or a lesser number of inputs, as established in particular by a consideration of the nature of the specific type of equipment in connection with which it is desired to utilize the future behavior equipment predictive system 128 of the present invention for purposes of effectuating an appraisal of the future behavior of the equipment in question. The key determinants, insofar as the number of inputs that are provided to the degradation means 134 is concerned, are the nature of the equipment whose future behavior is sought to be appraised, and the extent to which data relating to the degradation of such equipment is available.

The final component of the future behavior equipment predictive system 128 which has yet to be described is that of the updating means 136. The function of the updating means 136 is to cause the future behavior equipment predictive system 128 to be a living system. To this end, the updating means 136 is designed to function as a receiver and a reservoir of data relating to the continuous performance and availability of the equipment which in this case is deemed to be the boiler 10 that is to be found depicted in FIG. 1 of the drawing and which has been described hereinbefore. As such, the updating means 136 is designed to receive a plurality of inputs from the boiler 10. More specifically, the updating means 136, on the one hand, is made to receive a first input, the latter being denoted in FIG. 2 by the reference numeral 166, in the form of data relating to the current performance of the boiler 10. On the other hand, the updating means 136 is made to receive a second input, the latter being denoted in FIG. 2 by the reference numeral 168, in the form of data relating to the current availability of the boiler 10. Although the updating means 136 has been depicted in FIG. 2 and has been described hereinbefore as being provided with a pair of inputs, i.e., the inputs 166 and 168, it is to be understood that the updating means 136 may, without departing from the essence of the present invention, be provided with a greater number of inputs, as established in particular by a consideration of the nature of the specific type of equipment in connection with which it is desired to utilize the future behavior equipment predictive system 128 of the present invention for purposes of effectuating an appraisal of the future behavior of the equipment in question. The key determinants, insofar as the number of inputs that are provided to the updating means 136 is concerned, are the nature of the equipment whose future behavior is sought to be appraised, and the extent to which data of an updating nature relating to such equipment is available.

To briefly summarize, the future behavior equipment predictive system 128 is constructed around a core consisting of the performance means 130 and the availability means 132. By virtue of the inputs, e.g., the inputs 138, 140, 142, 144, 146 and 148, that are fed to the performance means 130 there is established within the latter a bank of data relating to the performance characteristics of the equipment which in the present instance comprises the boiler 10. In a similar fashion, by virtue of the inputs, e.g., the inputs 150, 152, 154 and 156, that are fed to the availability means 132 there is established within the latter a bank of data relating to the availability characteristics of the equipment which comprises in this instance the boiler 10. The performance means 130 and the availability means 132 in turn are each operatively connected to the updating means 136 so as to receive an output therefrom. To this end, by virtue of the inputs, e.g., the inputs 166 and 168 that are fed from the equipment, e.g., the boiler 10, to the updating means 136 there is established within the latter a bank of data relating to the current performance characteristics and availability characteristics of the boiler 10. When data from the updating means 136 is received by the performance means 130 and the availability means 132, the effect thereof is to effectuate an updating of the data in the performance means 130 and/or in the availability means 132. Since the performance characteristics data in the performance means 130 and the availability characteristics data in the availability means 132 are each subject to updating by virtue of the fact that data is transmitted thereto from the updating means 136, the future behavior equipment predictive system 128 constructed in accordance with the present invention is perceived to be a living system; namely, as changes in the current performance characteristics and in the current availability characteristics of the boiler 10 occur these changes become reflected in the performance characteristics data that is to be found in the performance means 130 and in the availability characteristics data that is to be found in the availability means 132. Continuing, the future behavior equipment predictive system 128 is further characterized in that both the performance means 130 and the availability means 132 are cross-linked to the degradation means 134 as a result of which the influence exerted by degradation on the performance characteristics and on the availability characteristics of the equipment, in this case the boiler 10, becomes reflected in the performance characteristics data that is to be found in the performance means 130 as well as in the availability characteristics data that is to be found in the availability means 132. To this end, by virtue of the inputs, e.g., the inputs 158, 160, 162 and 164, that are fed to the degradation means 134 there is established within the latter a bank of data relating to the degradation of the equipment which in this particular instance has been deemed to comprise the boiler 10. The degradation means 134 in turn is operatively connected to both the performance means 130 and the availability means 132 so that the data pertaining to degradation received by the degradation means 134 is assimilated with the performance characteristics data of the performance means 130 and the availability characteristics data of the availability means 132 such that the performance characteristics data of the performance means 130 and the availability characteristics data of the availability means 132 are each suitably modified so as to reflect the influence thereon of the degradation whereby there is thus provided from each of the performance means 130 and the availability means 132 an output, the latter being schematically represented in FIG. 2 of the drawing by the arrow which has been denoted therein by the reference numerals 170 and 172, respectively, which are designed to be utilized, as will be described more fully hereinafter, in the course of effectuating an appraisal of the future performance behavior and the future availability behavior of the equipment, which in the present case has been deemed to be the boiler 10 that has been depicted in FIG. 1 of the drawing.

A description will now be had, by way of exemplification and not limitation, to one way in which the afore-referenced outputs 170 and 172 may be utilized for purposes of effectuating an appraisal of the future behavior of equipment, e.g., the boiler 10 of FIG. 1. To this end, reference will be had in particular to FIGS. 3A, 3B and 3C of the drawing wherein FIG. 3A comprises a plot of performance versus time, FIG. 3B comprises a plot of availability versus time, and FIG. 3C comprises a plot of erosion versus time. With reference first to FIG. 3A of the drawing, for purposes of the discussion that follows the performance which is to be found plotted in FIG. 3A will be deemed to be that which is provided in the form of the output 170 from the performance means 130; namely, a plot of the performance characteristics data from the boiler 10 which has been modified so as to reflect the influence of degradation thereon. Thus, to continue, as best understood with reference to FIG. 3A, there is depicted therein a horizontal line, identified in FIG. 3A by the reference numeral 174 which extends from the vertical axis to the vertical line which is denoted in FIG. 3A by the reference numeral 176 and which bears the legend "PRESENT". The line 174 is intended to reflect in graphical form the past performance of the boiler 10 as taken from some preselected point in time up to the present. Based on the past performance of the boiler 10 as represented by the line 174 in FIG. 3A, confidence limits are established for the boiler 10 as regards the future performance behavior that one would expect to be provided henceforth by the boiler 10. For purposes of illustration, these confidence limits are represented by the lines 178 and 180 which as seen with reference to FIG. 3A extend horizontally from the line 176 to the vertical line denoted therein by the reference numeral 182 and which bears the legend "UPDATE". Referring further to FIG. 3A of the drawing, a plurality of data points, generally designated by the reference numeral 184, are depicted therein plotted in the area defined by the vertical lines 176 and 182, and the confidence limits 178 and 180. The data points 184 are predicated upon a plurality of outputs 170 being obtained from the performance means 130 during a period of elapsed time as measured along the time axis in FIG. 3A commencing at the vertical line 176 and terminating at the vertical line 182. At the end of this period of elapsed time, by virtue of the information that has been generated therein, i.e., the data points 184, it is now possible to refine the confidence limits 178 and 180, i.e., fine tune the confidence limits 178, 180, whereby a new set of confidence limits can be established within which it is projected that the future performance behavior of the boiler 10 will fall. These new confidence limits have been depicted in FIG. 3A by means of the dotted lines 184 and 186. The closer that the confidence limits for the future behavior of the equipment are capable of being set the more accurate will be the projection of the future performance behavior of the equipment, and concomitantly the better the position one is in to formulate those decisions which need to be made with respect to the future operation of the equipment, if an optimization of equipment performance and availability up to and beyond the design life of the equipment is to be achieved.

Attention will next be given to FIG. 3B of the drawing. In this regard, for purposes of the discussion that follows the availability which is to be found plotted in FIG. 3B will be deemed to be that which is provided in the form of the output 172 from the availability means 132; namely, a plot of the availability characteristics data from the boiler 10 which has been modified so as to reflect the influence of degradation thereon. Thus, to continue, as best understood with reference to FIG. 3B, there is depicted therein a horizontal line, identified in FIG. 3B by the reference numeral 188 which extends from the vertical axis to the vertical line which is denoted in FIG. 3B by the reference numeral 190 and which bears the legend "PRESENT". The line 188 is intended to reflect in graphical form the past availability of the boiler 10 as taken from some preselected point in time up to the present. Based on the past availability of the boiler 10 as represented by the line 188 in FIG. 3B, confidence limits are established for the boiler 10 as regards the future availability behavior that one would expect to be provided henceforth by the boiler 10. For purposes of illustration, these confidence limits are represented by the lines 192 and 194 which as seen with reference to FIG. 3B extend horizontally from the line 190 to the vertical line denoted therein by the reference numeral 196 and which bears the legend "UPDATE". Referring further to FIG. 3B of the drawing, a plurality of data points, generally designated by the reference numeral 198, are depicted therein plotted in the area defined by the vertical lines 190 and 196, and the confidence limits 192 and 194. The data points 198 are predicated upon a plurality of outputs 172 being obtained from the availability means 132 during a period of elapsed time as measured along the time axis in FIG. 3B commencing at the vertical line 190 and terminating at the vertical line 196. At the end of this period of elapsed time, by virtue of the information that has been generated therein, i.e., the data points 198, it is now possible to refine the confidence limits 192 and 194, i.e., fine tune the confidence limits 192, 194, whereby a new set of confidence limits can be established within which it is projected that the future availability behavior of the boiler 10 will fall. These new confidence limits have been depicted in FIG. 3B by means of the dotted lines 200 and 202. The closer that the confidence limits for the future behavior of the equipment are capable of being set the more accurate will be the projection of the future availability behavior of the equipment, and concomitantly the better the position one is in to formulate those decisions which need to be made with respect to the future operation of the equipment, if an optimization of equipment performance and availability up to and beyond the design life of the equipment is to be achieved.

Figure 3C:
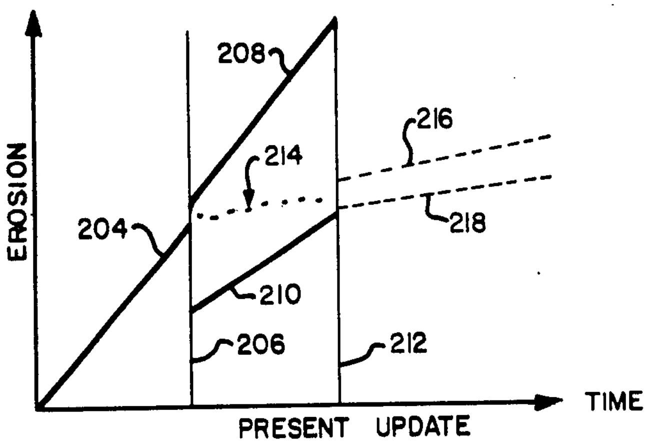
FIG. 3C is a graphical depiction of a plot of erosion versus time for a future behavior equipment predictive system constructed in accordance with the present invention.
Figure 3B:
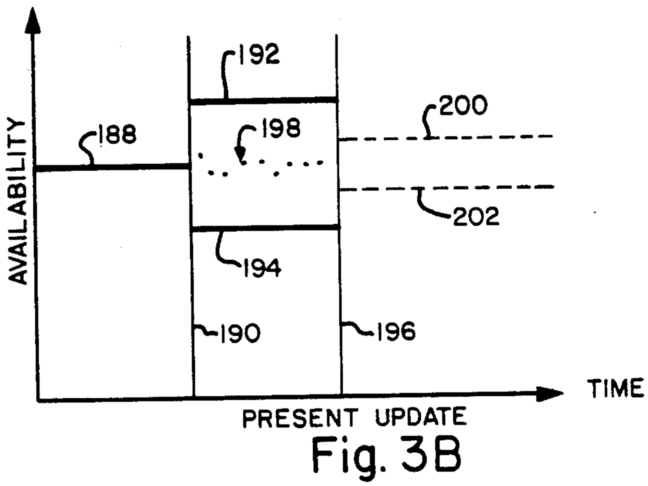
FIG. 3B is a graphical depiction of a plot of availability versus time for a future behavior equipment predictive system constructed in accordance with the present invention.
Figure 3A:
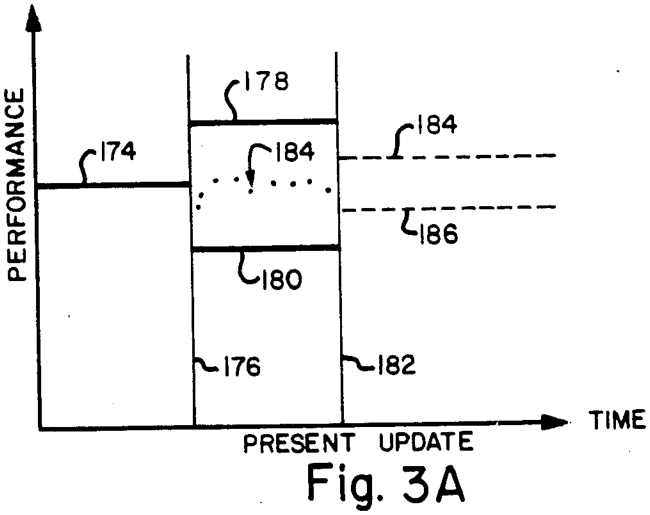
FIG. 3A is a graphical depiction of a plot of performance versus time for a future behavior equipment predictive system constructed in accordance with the present invention.

Lastly, as regards FIG. 3C of the drawing, there is depicted therein a plot of erosion versus time. Erosion has been selected for use in this regard simply as a means of exemplifying one of the various factors that are considered insofar as degradation is concerned. However, any of the factors that have been mentioned hereinbefore in connection with the discussions of degradation such as corrosion, fatigue or leakage, could have been selected for use for purposes of the discussion that follows without departing from the essence of the present invention. Thus, to continue, as best understood with reference to FIG. 3C, there is depicted therein a line, identified in FIG. 3C by the reference numeral 204 which extends from the vertical axis to the vertical line which is denoted in FIG. 3C by the reference numeral 206 and which has applied thereto the legend "PRESENT". The line 204 is intended to reflect in graphical form the extent of the erosion that has been suffered by the boiler 10 from some preselected point in time up to the present. Based on the extent of the erosion which the boiler 10 has suffered in the past, confidence limits are established for the boiler 10 as regards the future erosion behavior that one would expect henceforth from the boiler 10. For purposes of illustration, these confidence limits are represented by the lines 208 and 210 which as seen with reference to FIG. 3C extend from the line 206 to the vertical line denoted therein by the reference numeral 212 and which has applied thereto the legend "UPDATE". Referring further to FIG. 3C of the drawing, a plurality of data points, generally designated by the reference numeral 214, are depicted therein plotted in the area defined by the vertical lines 206 and 212, and the confidence limits 208 and 210. The data points 214 are predicated upon information generated from the operation of the future behavior equipment predictive system 128, constructed in accordance with the present invention, during a period of elapsed time as measured along the time axis in FIG. 3C commencing at the vertical line 206 and terminating at the vertical line 212. At the end of this period of elapsed time, by virtue of the information that has been generated therein, i.e., the data points 214, it is now possible to refine the confidence limits 208 and 210, i.e., fine tune the confidence limits 208, 210, whereby a new set of confidence limits can be established within which it is projected that the future erosion behavior of the boiler 10 will fall. These new confidence limits have been depicted in FIG. 3C by means of the dotted lines 216 and 218. The closer that the confidence limits for the future behavior of the equipment are capable of being set the more accurate will be the projection of the future erosion behavior of the equipment, and concomitantly the better the position one is in to formulate those decisions which need to be made with respect to the future operation of the equipment, if an optimization of equipment performance and availability up to and beyond the design life of the equipment is to be achieved.

Therefore, to summarize, the information, i.e., data, that is made available as a consequence of the operation of the future behavior equipment predictive system 128 can be utilized for purposes of effectuating an appraisal of the future behavior of the equipment which in the present instance comprises the boiler 10. More specifically, such information which is produced from the operation of the future behavior equipment predictive system 128 is designed to be utilized for purposes of evaluating the future behavior of the equipment, in this case the boiler 10, as a function of hypothetical repair/replace/refurbish options. The basis of these evaluations can be either cost/benefit or unavailability risk, or both. To this end, such information can be utilized for the following purposes: devising an inspection plan for the boiler 10 that is predicated upon extending the operating life of the boiler 10; devising a testing plan for the boiler 10 that is predicated upon extending the operating life of the boiler 10; compiling a prioritized list of the components of the boiler 10 that are expected to be the major cause of the unavailability of the boiler 10 at selected time intervals in the future; assessing when combined with the appropriate cost figures the cost/benefits of various repair/replace/refurbish strategies from the perspective of both performance and availability; compiling from the perspective of both performance and availability a prioritized list of outage, inspection, test, repair or replace activities that is predicated upon extending the operating life of the boiler 10; incorporating thereinto other diverse sources of diagnostic or monitoring data relating to the operation of the boiler 10; providing data applicable to the expected cycling performance and availability of the boiler 10; assessing from the standpoint of availability risk or cost/benefit the adequacy of various options involving different design criteria such as sizing, failure rate or performance characteristics of major equipment modifications to the boiler 10; examining as a function of the operating guidelines for the boiler 10 the performance/availability and extended life goals for the boiler 10 based on an assessment of the sensitivity of such goals to the operating guidelines for the boiler 10; identifying the future maintenance, outage and major spare part needs for the boiler 10 based on a given repair/replace/refurbish strategy for extending the operating life of the boiler 10; etc.

Thus, in accordance with the present invention there has been provided a new and improved system suitable for use for purposes of effectuating an appraisal of the future behavior of equipment. Moreover, the future behavior equipment predictive system of the present invention is characterized in that in the case of equipment that has been operational for some time a determination can be had therewith of the current remaining life status of the equipment. In addition, in accord with the present invention a future behavior equipment predictive system is provided which is characterized in that a comparison can be had therewith between the predictive performance and availability characteristics of the equipment and the actual performance and availability characteristics of the equipment. Further, the future behavior equipment predictive system of the present invention is characterized in that projections can be had therewith as to the degradation of the equipment for purposes of planning future operating and/or repair/replace/refurbish strategies. Additionally, in accordance with the present invention a future behavior equipment predictive system is characterized in that consistent with plans for the future operation of the equipment predictions can be had therewith as to what should be required in terms of time, effort and resources to support such plans for the future operation of the equipment. Also, the future behavior equipment predictive system of the present invention is characterized in that usage can be made thereof in the evaluation of problems or solutions which have extended effects and span the interfaces between the equipment in question and other equipment. Furthermore, in accord with the present invention a future behavior equipment predictive system is provided which is characterized in that the system can either be employed with new equipment or be retrofitted to equipment that has already been placed in operation.

While only one embodiment of my invention has been shown, it will be appreciated that modifications thereof, some of which have been alluded to hereinabove, may still be readily made thereto by those skilled in the art. I, therefore, intend by the appended claims to cover the modifications alluded to herein as well as all the other modifications, which fall within the true spirit and scope of my invention.

What is claimed is:

1. A future boiler behavior predictive system for use for purposes of effectuating an appraisal of the future behavior of a boiler comprising:

a. performance means containing a bank of data relating to performance characteristics of the boiler, said performance means being provided with a plurality of inputs from a variety of sources, said plurality of inputs including a first input consisting of data derived from the manufacturer of the boiler relating to the performance characteristics of the boiler, a second input consisting of data derived from boiler industry and other boiler sources relating to the performance characteristics of the boiler, a third input consisting of data derived from past and present boiler users relating to the performance characteristics of the boiler, a fourth input consisting of data derived from the operator of the boiler relating to the performance characteristics of the boiler, a fifth input consisting of data derived from an inspection of the boiler, and a sixth input consisting of data derived from conducting testing on the boiler;

b. availability means containing a bank of data relating to availability characteristics of the boiler;

c. degradation means containing a bank of data relating to degradation characteristics of the boiler, said degradation means being connected in cross-linked relation to both said performance means and said availability means so as to effectuate the assimilation of the degradation characteristics data of said degradation means with the performance characteristics data of said performance means and the availability characteristics data of said availability means such that the performance characteristics data of said performance means and the availability characteristics data of said availability means are each made to reflect the degradation characteristics data of the boiler; and d. updating means containing a bank of data relating both to current performance characteristics of the boiler and to current availability characteristics of the boiler, said updating means being connected to both said performance means and said availability means so that data relating to the current performance characteristics of the boiler and the current availability characteristics of the boiler can be provided thereto for purposes of accomplishing an updating of the performance characteristics data of said performance means and the availability characteristics data of said availability means.

2. A future boiler behavior predictive system for use for purposes of effectuating an appraisal of the future behavior of a boiler comprising:

a. performance means containing as bank of data relating to performance characteristics of the boiler;

b. availability means containing a bank of data relating to availability characteristics of the boiler, said availability means being provided with a plurality of inputs from a variety of sources, said plurality of inputs including a first input consisting of data derived from the manufacturer of the boiler relating to the availability characteristics of the boiler, a second input consisting of data derived from boiler industry and other boiler sources relating to the availability characteristics of the boiler, a third input consisting of data derived from past and present boiler users relating to the availability characteristics of the boiler, and a fourth input consisting of data derived from the operator of the boiler relating to the availability characteristics of the boiler;

c. degradation means containing a bank of data relating to degradation characteristics of the boiler, said degradation means being connected in cross-linked relation to both said performance means and said availability means so as to effectuate the assimilation of the degradation characteristics data of said degradation means with the performance characteristics data of said performance means abd the availability characteristics data of said availability means such that the performance characteristics data of said performance means and the availability characteristics data of said availability means are each made to reflect the degradation characteristics data of the boiler; and d. updating means containing as bank of data relating both to current performance characteristics of the boiler and to current availability characteristics of the boiler, said updatng means being connected to both said performance means and said availability means so that data relating to the current performance characteristics of the boiler and the current availability characteristics of the boiler casn be provided thereto for purposes of accomplishing an updating of the performance characteristics data of said performance means and the availability characteristics data of said availability means.

3. A future boiler behavior predictive system for use for purposes of effectuating an appraisal of the future behavior of a boiler comprising:

a. performance means containing a bank of data relating to performance characteristics of the boiler;

b. availability means containing a bank of data relating to availability characteristics of the boiler;

c. degradation means containing a bank of data relating to degradation characteristics of the boiler, said degradation means being provided with a plurality of inputs from a variety of sources, said plurality of inputs including a first input consisting of data relating to erosion suffered by the boiler, a second input consisting of data relating to corrosion suffered by the boiler, a third input consisting of data relating to fatigue suffered by the boiler, and a fourth input consisting of data relating to leakage suffered by the boiler, said degradation means being connected in cross-linked relation to both said performance means and said availability means so as to effectuate the assimilation of the degradation characteristics data of said degradation means with the performance characteristics data of said performance means and the availability characteristics data of said availability means such that the performance characteristics data of said performance means and the availability characteristics data of said availability means are each made to reflect the degradation characteristics data of the boiler; and d. updating means containing a bank of data relating both to current performance characteristics of the boiler and to current availability characteristics of the boiler, said updating means being connected to both said performance means and said availability means so that data relating to the current performance characteristics of the boiler and the current availability characteristics of the boiler can be provided thereto for the purposes of accomplishing an updating of the performance characteristics data of said performance means and the availability characteristics data of said availability means.

4. A future boiler behavior predictive system for use for purposes of effectuating an appraisal of the future behavior of a boiler comprising:

a. performance means containing a bank of data relating to performance characteristics of the boiler;

b. availability means containing a bank of data relating to availability characteristics of the boiler;

c. degradation means containing a bank of data relating to degradation characteristics of the boiler, said degradation means being connected in a cross-linked relation to both said performance means and said availability means so as to effectuate the assimilation of the degradation characteristics data of said degradation means with the performance characteristics data of said performance means and the availability characteristics data of said availability means such that the performance characteristics data of said performance means and the availability characteristics data of said availability means are each made to reflect the degradation characteristics data of the boiler; and d. updating means containing a bank of data relating both to current performance characteristics of the boiler and to current availability characteristics of the boiler, said updating means being provided with a plurality of inputs from a variety of sources, said plurality of inputs including a first input consisting of data relating to the current performance characteristics of the boiler and a second input consisting of data relating to the current availability characteristics of the boiler, said updating means being connected to both said performance means and said availability means so that data relating to the current performance characteristics of the boiler and the current availability characteristics of the boiler can be provided hereto for purposes of accomplishing an updating of the performance characteristics data of said performance means and the availability characteristics data of said availability means.

5. A future equipment behavior predictive system for use for purposes of effectuating an appraisal of the future behavior of equipment comprising:

a. performance means containing a bank of data relating to performance characteristics of the equipment, said performance means being provided with a plurality of inputs from a variety of sources, said plurality of inputs including a first input consisting of data derived from the manufacturer of the equipment relating to the performance characteristics of the equipment, a second input consisting of data derived from industrial and other equipment sources relating to the performance characteristics of the equipment, a third input consisting of data derived from past and present equipment users relating to the performance characteristics of the equipment, a fourth input consisting of data derived from the operator of the equipment relating to the performance characteristics of the equipment, a fifth input consisting of data derived from an inspection of the equipment, and a sixth input consisting of data derived from conducting testing on the equipment;

b. availability means containing a bank of data relating to availability characteristics of the equipment;

c. degradation means containing a bank of data relating to degradation characteristics of the equipment, said degradation means being connected in cross-linked relation to both said performance means and said availability means so as to effectuate the assimilation of the degradation characteristics data of said degradation means with the performance characteristics data of said performance means and the availability characteristics data of said availability means such that the performance characteristics data of said performance means and the availability characteristics data of said avaibility means are each made to reflect the degradation characteristics data of the equipment; and d. updating means containing a bank of data relating both to current performance characteristics of the equipment and to current availability characteristics of the equipment, said updating means being connected to both said performance means and said availability means so that data relating to the current performance characteristics of the equipment and the current availability characteristics of the equipment cna be provided thereto for purposes of accomplishing an updating of the performance characteristics data of said performance means and the availability characteristics data of said availability means.

6. A future equipment behavior predictive system for use for purposes of effectuating an appraisal of the future behavior of equipment comprising:

a. performance means containing a bank of data relating to performance characteristics of the equipment;

b. availability means containing a bank of data relating to availability characteristics of the equipment, said availability means being provided with a plurality of inputs from a variety of sources, said plurality of inputs including a first input consisting of data derived from the manufacturer of the equipment relating to the availability characteristics of the equipment, a second input consisting of data derived from industrial and other equipment sources relating to the availability characteristics of the equipment, a third input consisting of data derived from past and present equipment users relating to the availability characteristics of the equipment, and a fourth input consisting of data derived from the operator of the equipment relating to the availability characteristics of the equipment;

c. degradation means containing a bank of data relating to degradation characteristics of the equipment, said degradation means being connected to cross-linked relation to both said performance means and said availability means so as to effectuate the assimilation of the degradation characteristics data of said degradation means with the performance characteristics data of said performance means and the availability characteristics of said availability means such that the performance characteristics data of said performance means and the availability characteristics data of said availability means are each made to reflect the degradation characteristics data of the equipment; and d. updating means containing a bank of data relating both to current performance characteristics of the equipment and to current availability characteristics of the equipment, said updating means being connected to both said performance means and said availability means so that data relating to the current performance characteristics of the equipoment and the current availability characteristics of the equipment can be provided thereto for purposes of accomplishing an updating of the performance characteristics data of said performance means and the availability characteristics data of said availability means.

7. A future equipment behavior predictive system for use for purposes of effectuating an appraisal of the future behavior of equipment comprising:

a. performance means containing a bank of data relating to performance characteristics of the equipment;
b. availability means containing a bank of data relating to availability characteristics of the equipment;
c. degradation means containing a bank of data relating to degradation characteristics of the equipment, said degradation means being provided with a plurality of inputs from a variety of sources, said plurality of inputs including a first input consisting of data relating to erosion suffered by the equipment, a second input consisting of data relating to corrosion suffered by the equipment, a third input consisting of data relating to fatigue suffered by the equipment, and a fourth input consisting of data relating to leakage suffered by the equipment, said degradation means being connected in cross-linked relation to both said performance means and said availability means so as to effectuate the assimilation of the degradation characteristics data of said degradation means with the performance characteristics data of said performance means and the availability characteristics data of said availability means such that the performance characteristics data of said performance means and the availability characteristics data of said availability means are each made to reflect the degradation characteristics data of the equipment; and
d. updating means containing a bank of data relating both to current performance characteristics of the equipment and to current availability characteristics of the equipment, said updating means being connected to both said performance means and said availability means so that data relating to the current performance characteristics of the equipment and the current availability characteristics of the equipment can be provided thereto for purposes of accomplishing an updating of the performance characteristics data of said performance means and the availability characteristics data of said availability means.

8. A future equipment behavior predictive system for use for purposes of effectuating an appraisal of the future behavior of equipment comprising:

a. performance means containing a bank of data relating to performance characteristics of the equipment;
b. availability means containing a bank of data relating to availability characteristics of the equipment;
c. degradation means containing a bank of data relating to degradation characteristics of the equipment, said degradation means being connected in cross-linked relation to both said performance means and said availability means so as to effectuate the assimilation of the degradation characteristics data of said degradation means with the performance characteristics data of said performance means and the availability characteristics data of said availability means such that the performance characteristics data of said performance mean and the availability characteristics data of said availability means are each made to reflect the degradation characteristics data of the equipment; and
d. updating means containing a bank of data relating both to current performance characteristics of the equipment and the current availability characteristics of the equipment, said updating means being provided with a plurality of inputs from a variety of sources, said plurality of inputs including a first input consisting of data relating to the current performance characteristics of the equipment and a second input consisting of data relating to the current availability characteristics of the equipment, said updating means being connected to both said performance means and said availability means so that data relating to the current performance characteristics of the equipment and the current availability characteristics of the equipment can be provided thereto for purposes of accomplishing an updating of the performance characteristics data of said performance means and the availability characteristics data of said availability means.

9. A method of effectuating an appraisal of the future behavior of equipment comprising the steps of:

a. establishing a bank of data relating to the performance characteristics of the equipment from a plurality of inputs from a variety of sources including a first input consisting of data derived from the manufacturer of the equipment relating to the performance of the equipment, a second input consisting of data derived from industrial and other equipment sources relating to the performance characteristics of the equipment, a third input consisting of data derived from past and present equipment users relating to the performance characteristics of the equipment, a fourth input consisting of data derived from the operator of the equipment relating to the performance characteristics of the equipment, a fifth input consisting of data derived from an inspection of the equipment, and a sixth input consisting of data derived from conducting testing on the equipment;
b. establishing a bank of data relating to the availability characteristics of the equipment;
c. establishing a bank of data relating to the degradation characteristics of the equipment;

connecting in cross-linked relation the bank of data relating to the degradation characteristics of the equipment to both the bank of data relating to the performance characteristics of the equipment and the bank of data relating to the availability characteristics of the equipment so as to effectuate the assimilation of the degradation characteristics data with the performance characteristics data and the availability characteristics data such that the performance characteristics data and the availability characteristics data are each made to reflect the degradation characteristics data of the eqipment;

e. establishing a bank of data relating to the current performance characteristics of the equipment and to the current availability characteristics of the equipment; and
f. connecting the bank of data relating to the current performance characteristics of the equipment and to the current availability characteristics of the equipment to both the bank of data relating to to the performance characteristics of the equipment and to the bank of data relating to the availability characteristics of the equipment so that data relating to the current performance characteristics and to the current availability characteristics of the equipment can be provided thereto for purposes of accomplishing an updating of the performance characteristics data and an updating of the availability characteristics data.

10. A method of effectuating an appraisal of the future behavior of equipment comprising the steps of:

a. establishing a bank of data relating to the performance characteristics of the equipment;

b. establishing a bank of data relating to the availability characteristics of the equipment from a plurality of inputs from a variety of sources including a first input consisting of data derived from the manufacturer of the equipment relating to the availability characteristics of the equipment, a second input consisting of data derived from industrial and other equipment sources relating to the availability characteristics of the equipment, a third input consisting of data derived from past and present equipment users relating to the availability characteristics of the equipment, and a fourth input consisting of data derived from the operator of the equipment relating to the availability characteristics of the equipment;

c. establishing a bank of data relating to the degradation characteristics of the equipment;

d. connecting in cross-linked relation the bank of data relating to the degradation characteristics of the equipment to both the bank of data relating to the performance characteristics of the equipment and the bank of data relating to the availability characteristics of the equipment so as to effectuate the assimilation of the egradation characteristics data with the performance characteristics data and the availability characteristics data such that the performance characteristics data and the availability characteristics data are each made to reflect the degradation characteristics data of the equipment;

e. establishing a bank of data relating to the current performance characteristics of the equipment and to the current availability characteristics of the equipment; and f. connecting the bank of data relating to the current performance characteristics of the equipment and to the current availability characteristics of the equipment to both the bank of data relating to the performance characteristics of the equipment and to the bank of data relating to the availability characteristics of the equipment so that data relating to the current performance characteristics and to the current availability characteristics of the equipment can be provided thereto for purposes of accomplishing an updating of the performance characteristics data and an updating of the availability characteristics data.

11. A method of effectuating an appraisal of the future behavior of equipment comprising the steps of:

a. establishing a bank of data relating to the performance characteristics of the equipment;

b. establishing a bank of data relating to the availability characteristics of the equipment;

c. establishing a bank of data relating to the degradation characteristics of the equipment from a plurality of inputs from a variety of sources including a first input consisting of data relating to erosion suffered by the equipment, a second input consisting of data relating to corrosion suffered by the equipment, a third input consisting of data relating to fatigue suffered by the equipment, and a fourth input consisting of data relating to leakage suffered by the equipment;

d. connecting in cross-linked relation the bank of data relating to the degradation characteristics of the equipment to both the bank of data relating to the performance characteristics of the equipment and the bank of data relating to the availability characteristics of the equipment so as to effectuate the assimilation of the degradation characteristics data with the performance characteristics data and the availability characteristics data such that the performance characteristics data and the availability characteristics data are each made to reflect the degradation characteristics data of the equipment;

e. establishing a bank of data relating to the current performance characteristics of the equipment and to the current availability characteristics of the equipment; and f. connecting the bank of data relating to the current performance characteristics of the equipment and to the current availability characteristics of the equipment to both the bank of data relating to the performance characteristics of the equipment and to the bank of data relating to the availability characteristics of the equipment so that data relating to the current performance characteristics and to the current availability characteristics of the equipment can be provided thereto for purposes of accomplishing an updating of the performance characteristics data and an updating of the availability characteristics data.

12. A method of effectuating an appraisal of the future behavior of equipment comprising the steps of:

a. establishing a bank of data relating to the performance characteristics of the equipment;

b. establishing a bank of data relating to the availability characteristics of the equipment;

c. establishing a bank of data relating to the degradation characteristics of the equipment;

d. connecting in cross-linked relation the bank of data relating to the degradation characteristics of the equipment to both the bank of data relating to the performance characteristics of the equipment and the bank of data relating to the availability characteristics of the equipment so as to effectuate the assimilation of the degradation characteristics data with the performance characteristics data and the availability characteristics data such that the performance characteristics data and the availability characteristics data are each made to reflect the degradation characteristics data of the equipment;

e. establishing a bank of data relating to the current performance characteristics of the equipment and to the current availability characteristics of the equipment from a plurality of inputs from a variety of sources including a first input consisting of data relating to the current performance characteristics of the equipment and a second input consisting of data relating to the current availability characteristics of the equipment; and f. connecting the bank of data relating to the current performance characteristics of the equipment and to the current availability characteristic of the equipment to both the bank of data relating to the performance characteristics of the equipment and to the bank of data relating to the availability characteristics of the equipment so that data relating to the current performance characteristics and to the current availability characteristics of the equipment can be provided thereto for purposes of accomplishing an updating of the performance characteristics data and an updating of the availability characteristics data.

* * * * *